United States Patent
So et al.

(10) Patent No.: US 6,212,168 B1
(45) Date of Patent: Apr. 3, 2001

(54) SUBSCRIBER CONTROL MODULE HAVING A TEST APPARATUS FOR ASYNCHRONOUS TRANSFER MODE

(75) Inventors: Woon Seob So; Sung Mo Yang; Seung Han Lee; Jin Tae Kim; Hae Geun Kim, all of Daejeon (KR)

(73) Assignees: Electronics and Telecommunications Research Institute, Daejeon; Korea Telecom, Seoul, both of (JP)

( * ) Notice: Subject to any disclaimer, the term of this patent is extended or adjusted under 35 U.S.C. 154(b) by 0 days.

(21) Appl. No.: 08/961,230

(22) Filed: Oct. 30, 1997

(30) Foreign Application Priority Data

Dec. 21, 1996 (KR) .................................................. 96-69770

(51) Int. Cl.[7] ............................... H04J 3/14; H04L 12/56
(52) U.S. Cl. .......................... 370/244; 370/248; 370/251; 370/395
(58) Field of Search .................................. 370/241, 244, 370/247, 248, 249, 250, 251, 389, 395, 397, 398, 242, 410; 714/25, 43

(56) References Cited

U.S. PATENT DOCUMENTS

| 5,251,204 | * | 10/1993 | Izawa et al. | 370/249 |
|---|---|---|---|---|
| 5,408,461 | * | 4/1995 | Uriu et al. | 370/248 |
| 5,457,700 |   | 10/1995 | Merchant | 714/744 |
| 5,500,851 | * | 3/1996 | Kozaki et al. | 370/250 |
| 5,570,357 |   | 10/1996 | van Tetering et al. | 714/712 |
| 5,602,826 | * | 2/1997 | Yoshimura et al. | 370/248 |
| 5,710,760 | * | 1/1998 | Moll | 370/249 |
| 5,737,338 | * | 4/1998 | Eguchi et al. | 370/249 |
| 5,875,177 | * | 2/1999 | Uriu et al. | 370/248 |
| 5,887,000 | * | 3/1999 | Adachi et al. | 370/241 |

* cited by examiner

Primary Examiner—Chau Nguyen
Assistant Examiner—Soon-Dong Hyun
(74) Attorney, Agent, or Firm—Jacobson, Price, Holman & Stern, PLLC

(57) ABSTRACT

The present invention relates to a subscriber control module having a test apparatus suitable for testing internal routes in an Asynchronous Transfer Mode ATM exchange system for improved reliability and effective maintenance thereof. A subscriber control module having testing functions makes it possible that internal whole routes in the exchange system under the control by maintenance control module inside the system can be tested through the use of subscriber switching network and connection switching network. Further, a test apparatus of the present invention placed inside the exchange system can test ATM subscribers with individually different rates, configured in such a way to be identical with boards used in the exchange system so that the test apparatus can be installed inside the exchange system.

3 Claims, 3 Drawing Sheets

SUBSCRIBER CONTROL MODULE HAVING A TEST APPARATUS FOR ASYNCHRONOUS TRANSFER MODE

BACKGROUND OF THE INVENTION

1. Field of the Invention

The present invention relates to a subscriber control module having a test apparatus which is suitable for testing internal routes in an Asynchronous Transfer Mode ATM exchange system, so that improved reliability and effective maintenance thereof are secured.

2. Description of the Conventional Art

For the use of test apparatus modules for Asynchronous Transfer Mode exchange system, there has been, conventionally, used different test apparatus modules for different rates subscribers. However, relatively bulky modules can be coupled thereto only from the external of the exchange system, without being installed inside ATM exchange system.

Thus, it is required to use the number of test apparatus modules corresponding to the subscribers with different rates, respectively, selected to be tested, and further such many modules are to be coupled from the external of the exchange system.

There occurs the problem in that internal routes in the exchange system cannot be tested under the control of a maintenance control module existing inside the system.

SUMMARY OF THE INVENTION

Therefore, the present invention aimed to solve the above-mentionend problem provides a subscriber control module having testing functions by which all internal routes in the exchange system under the control by maintenance control module inside the system can be tested through the use of subscriber switching network and connection switching network. A test apparatus of the present invention placed inside the exchange system can test ATM subscribers at individually different rates, configured in such a way to be identical with boards used in the exchange system so that the test apparatus can be installed inside the exchange system.

To achieve the object of the present invention, there is provided a subscriber control module comprising: cell multiplexing/demultiplexing means which is coupled to a subscriber switching network module through the connections between internal modules, multiplexes and transports cells into the subscriber switching network module, demultiplexes cells received through the subscriber switching network module and transports them depending upon the destinations; call-connecting control means coupled to the cell multiplexing/demultiplexing means and for receiving and tansporting the internal control cells, outputting warning messages of Off_Alm and Fun_Alm, and communication with a maintenance control module in a central exchange subsystem to control the call connections; test functioning means which analyzes the received control cells in response to the receipt of internal route testing commands through the control cells incoming from the call-connecting control means and generates and transports the test cells appropriate to the internal testing routes and which analyzes the test cells received through the internal routes, and by which the results under the internal control cell format are reported to the call-connecting control means, and which outputs the Off_Alm, Fun_Alm warning messages; and warning message collecting means which collects warning messages generated from the test functioning means, call-connecting control means and cell multiplexing/demultiplexing means, and also collects warning messages generated from respective modules in the local exchange subsystem, and by which the results under the internal message format are reported to the call-collecting control means.

BRIEF DESCRIPTION OF THE DRAWINGS

The present invention will become more fully understood to following detailed description taken in conjunction with the accompanying drawings, wherein.

DETAILED DESCRIPTION OF THE INVENTION

The preferred embodiment according to the present invention will now be described in detail in accordance with the accompanying drawings.

Figure 1:
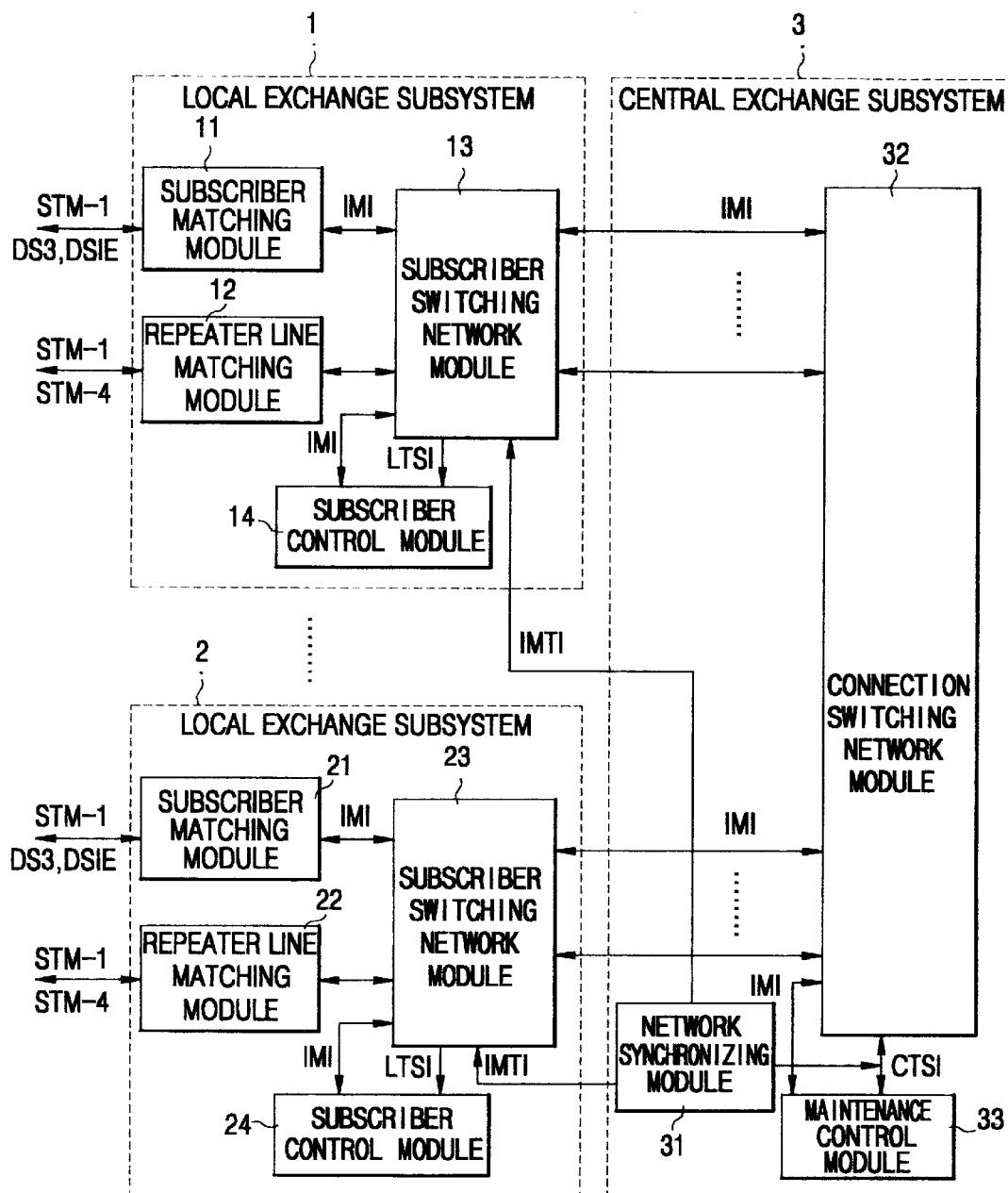
FIG. 1 shows a schematic diagram for illustrating ATM exchange system to which the present invention is applied.

FIG. 1 is a schematic diagram for illustrating ATM exchange system to which the present invention is applied, the system consisting of a central exchange subsystem 3 and plural local exchange subsystems 1, 2.

Local exchange subsystems 1, 2 include: subscriber matching modules 11, 21 allowing respective subscribers of STM-1 (155 Mbps), DS3 (45 Mbps) and DS1E (2 Mbps) to be connected to the subscriber switching network; STM-1 (155 Mbps) repeater line; repeater line matching modules 12, 22 which allow STM-4 (622 Mbps) repeater line to be connected to the subscriber switching network; subscriber switching network modules 13, 23 which allow the subscriber matching modules 11, 21, repeater line matching modules 12, 22 and subscriber control modules 14, 24 to be connected to the connection switching network; and the subscriber control module 14, 24 according to the present invention which are responsible for collecting respective warning messages from the modules in the local exchange subsystems and for making maintenance controls and connection of calls.

The connections of respective modules and subscriber switching network modules 13, 23 are made through the inter module interfaces IMI, wherein the number of the required IMI is varied depending upon the rates of either subscribers or repeaters.

The central subsystem 3 allows the local exchange subsystems 1, 2 to be connected to each other, and performs general controls of the system. The central subsystem 3 includes a network synchronizing module 31, the connection switching network module 32 and maintenance control module 33.

The network synchronizing module 31 generates, for the purpose of a synchronizing of an overall exchange network, the clocks for the network synchronization and then supplies inter module timing clocks IMTI and central timing clocks CTSI whose periods are identical to that of IMTI into respective various modules of the subscriber switching network modules 13, 23, connection switching network module 32 and maintenance control module 33. The connection switching module 32 allows the subscriber switching network modules 12 and 32 to be connected to each other, and is connected to the maintenance control module functioning to perform the maintenance control of the overall exchange system and management thereof.

Figure 2:
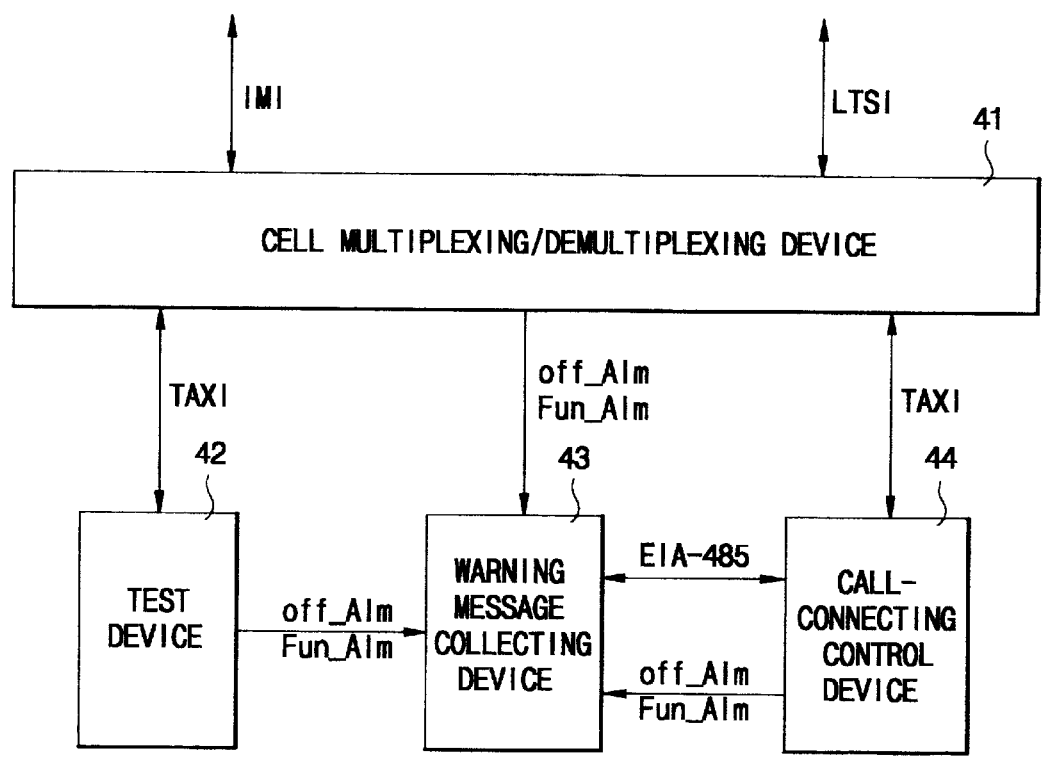
FIG. 2 shows a subscriber control module having test functions according to the present invention.

Referring to FIG. 2 showing the subscriber control module according to the present invention, this module includes a cell multiplexing/demultiplexing device 41, a test device 42, a warning message collecting device 43 and a call-connecting control device 44, collects warning messages and controls the maintenance and call-connections.

The cell multiplexing/demultiplexing device 41 transports and receives a series data at 187.79 Mbps to and from the subscriber switching network modules 13, 23 through the IMI, and further receives from the subscriber switching network module the local timing signals LTSI used for synchronizing clocks of the data. In addition, the cell multiplexing/demultiplexing device 41 multiplexes the incoming cells from the test device 42 and call-connecting control device 44 through the 100 Mbps-rate series TAXI port thereof and then outputs it to the subscriber switching network modules 13, 23. The device 41 demultiplexes the incoming cells from the subscriber switching network modules to output it the test device 42 and TAXI port of the call-connecting control device 44 depending upon the destinations. Further, the device 41 outputs the warning messages of Off_Alm and Fun_Alm, the warning messages being substantially signals of a logical high level, to the warning message collecting device 43.

The warning message collecting device 43 collects the warning messages generated from the respective test device 42, call-connecting control device 44 and cell multiplexing/demultiplexing device 41, as well as the warning messages generated from each of the modules in the local exchange subsystem (not illustrated). Then, the collected results under the internal message format are notified to the call-connecting control device 44.

There are provided an internal controlled cell communications between the call-connecting control device 44 and the cell multiplexing/demultiplexing device 41 connected thereto through the TAXI port, and an internal message communication between the call-connecting control device 44 and the warning message collecting device 43 through the EIA-485 based series port. Also, the call-connecting control device 44 outputs the OFF_Alm and Fun_Alm to the warning message collecting device 43.

Further, the call-connecting control device 44 communicates with the maintenance control module of the central exchange subsystem to control the call connections.

Figure 3:
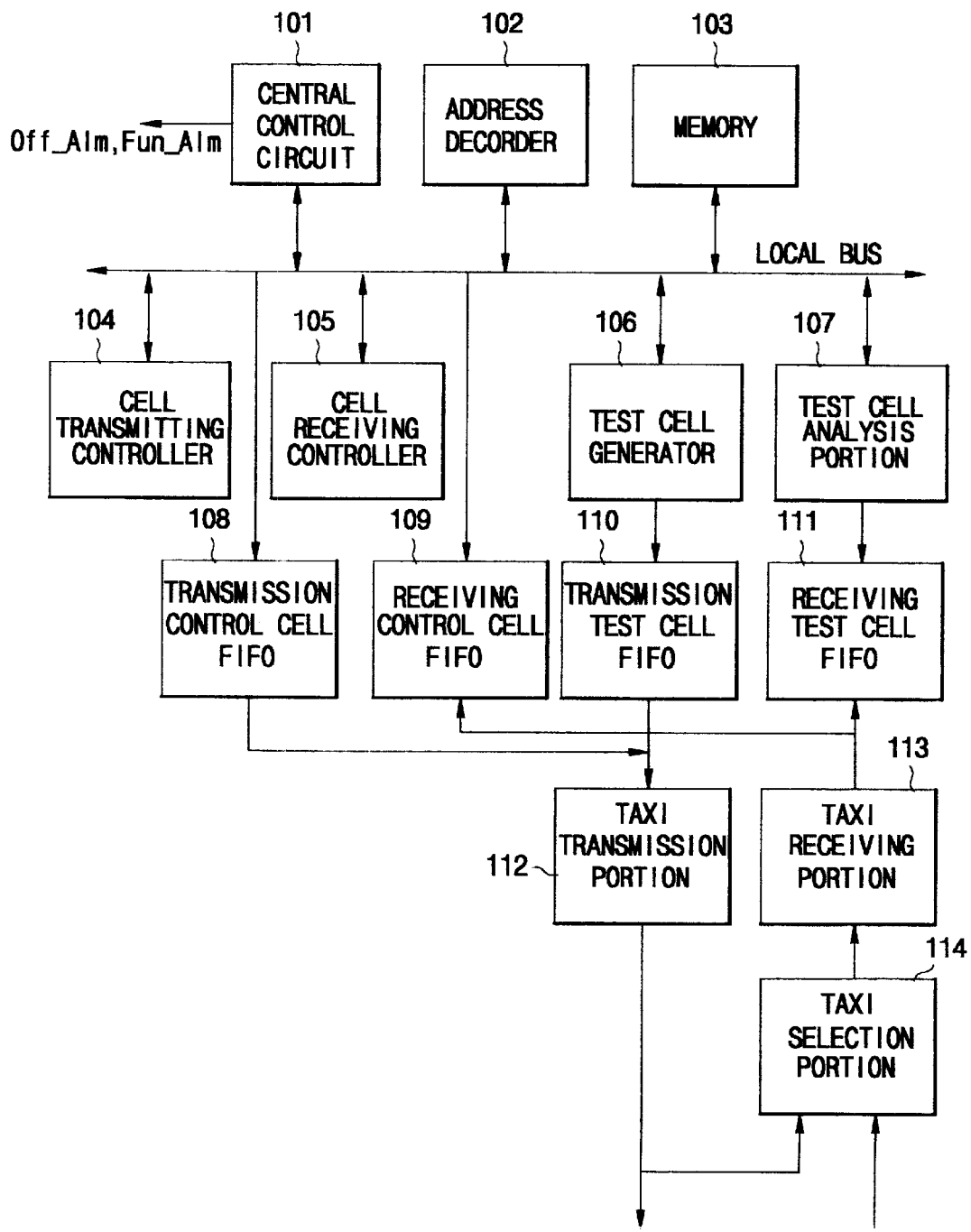
FIG. 3 is a block diagram of the test apparatus in accordance with the present invention.

FIG. 3 is a block diagram of the test device in accordance with the present invention, the test device includes: a central control circuit portion 101, an address decoding portion 102, a memory portion 103, a cell transmitting control portion 104, a cell receiving control portion 105, a test cell generating portion 106, a test cell analysis portion 107, a transmission control cell FIFO 108, a receiving control cell FIFO 109, a transmitting test cell FIFO 110, a receiving test cell FIFO 111, a TAXI transmission portion 112, a TAXI receiving portion 113, and a TAXI selection portion 114.

The central control circuit portion 101 substantially comprises such as 32 bit-based processor, which generally controls the test device, supplies the required clocks into the test device and generates and supplies a resetting signal.

Address and control signals from the central control circuit portion 101 are forwarded through local busses to the address decoding portion 102 which combines the received signals to designate respective addresses associated with components and resisters in respective portions of the test device.

The memory portion 103 coupled to the local buses includes ROM for storing programs and RAMS for storing various types of data.

The cell transmitting control portion 104 coupled the local buses controls the transmission of control cells to report the current status of the test device or the route test results under the control of the central control circuit portion 101 to the call-connecting control device, and further controls, based upon the content of the received control cells from the call-connecting control device, the transmission of test cells used for testing the internal routes in the exchange system.

The cell receiving control portion 105 is coupled to the local buses to control the receiving of the control cells and test cells in response to the central control circuit portion 101.

The test cell generating portion 106 is coupled to the local buses to actually generate the physical test cells under the control of the cell transmitting control portion 104 to store them in the transmitting test cell FIFO 110.

The test cell analysis portion 107 reads the test cells received from the receiving test cell FIFO 111 to physically analyze the content of the received test cells to deliver the result to the central control circuit portion 101 through the local buses.

The transmission control cell FIFO 108 receives through the local buses the control cells which are generated from the central control circuit portion 101 to temporarily store the received cells, and delivers the stored cells to the TAXI transmission portion 112 under the control of the cell transmitting control portion 104.

The receiving control cell FIFO 109 temporarily stores the control cells received from the TAXI receiving portion 113 to then deliver through the local buses them to the central control circuit portion 101 under the control of the cell receiving control portion 105.

The transmitting test cell FIFO 110 temporarily stores the test cells generated from the test cell generating portion 106, and transports them to the TAXI transmission portion 112 thereafter.

The receiving test cell FIFO 111 temporarily stores the test cells generated from the TAXI receiving portion 113, and transports them to the test cell analysis portion 107 thereafter.

The TAXI transmission portion 112 receives in parallel the control cells and test cells, these cells being transported through the TAXI port and cell multiplexing/demultiplexing device and then towards the call-connecting control device, from the transmission control cell FIFO 108 and transmitting test cell FIFO 110, converts the received cells into the series data and then outputs it to the TAXI port.

The TAXI receiving portion 113 converts it into the corresponding parallel data either control or test cells serially received from the TAXI selection portion 114, and then outputs them to the receiving test cell FIFO 111 or the receiving control cell FIFO 109.

The TAXI selection portion 114 selects the series data output from the TAXI transmission portion 112 during the loopback testing mode, but, otherwise, selects the data from the cell multiplexing/demultiplexing device to transport it to the TAXI receiving portion 113.

It can be seen from the foregoing that the test apparatus thus constructed allows the control cells made for reporting the current status of the test apparatus obtained by receiving the control cells from the call-connecting control device and by analyzing their contents to forward them to the call-connecting control device, or the test apparatus forms the control cells relating to the results obtained by generating the test cells, transporting the cells to the route to be tested, receiving and analyzing the test cells from the route and then outputs the control cells thus produced to the call-connecting control device.

While particular embodiment of the present invention has been illustrated and described, it is to be understood that the invention is not limited to the preferred embodiment and that various modifications, changes, and variations will be apparent from the foregoing descriptions without departing from the spirit and scope of the invention.

For ATM exchange system, it is possible to, according to the present invention, allow an operator for the exchange system to test overall routes in the subscriber and switching network within the exchange system using the test apparatus placed in the subscriber control module of the respective local exchange subsystem, to test the subscribers at various rates. Further, the present invention provides an easy installation of the test apparatus in the exchange system, and various tests available from the application softwares.

What is claimed is:

1. A subscriber control module comprising:

a cell multiplexing/demultiplexing means coupled to a subscriber switching network module for the connections between subscriber matching modules, repeater line matching modules, subscriber switching network modules, connection switching network for multiplexing and transporting cells into the subscriber switching network module, demultiplexing cells received through the subscriber switching network module, and transporting them depending upon destinations:

a call-connecting control means coupled to the cell multiplexing/demultiplexing means, for receiving and transporting internal control cells between the call-connecting control means and the cell multiplexing/demultiplexing means, outputting warning messages of Off_Alm and Fun_Alm, and communicating with a maintenance control module in a central exchange subsystem to control call connections;

a test functioning means for analyzing the received internal control cells in response to the receipt of internal route testing commands through the internal control cells incoming from the call-connecting control means, generating and transporting test cells appropriate to internal testing routes, analyzing the test cells received through the internal testing routes, reporting the results of the analysis in internal control cell format to the call-connecting control means, and outputting the Off_Alm, Fun_Alm warning messages; and a warning message collecting means for collecting warning messages generated from the test functioning means, call-connecting control means and cell multiplexing/demultiplexing means, and also collecting warning messages generated from respective modules in the local exchange subsystem, and reporting the results of the collection in the internal control cell format to the call-collecting control means.

2. The subscriber control module of claim 1, wherein the test function means and call-connecting control means are coupled to the cell multiplexing/demultiplexing means through TAXI, the TAXI performing the conversion of serial to parallel and parallel to serial.

3. The subscriber control module of claim 1, wherein the test function means comprises:

a central control means for controlling the overall test function means with processor, supplying clocks into the test function means and generating a reset signal;

buses connected to the central control means:

a means for decoding address signals and control signals incoming through the buses from the central control means;

a means coupled to the buses, for storing programs and various types of data;

a cell transporting control means coupled to the buses, for controlling, under the control of the central control means, the transportation of the control and test cells;

a cell receiving control means coupled to the buses, for controlling, under the control of the central control means, the receipt of the control and test cells;

a test cells generating means coupled to the buses, for generating the test cells under the control of the central control means;

a test cell analyzing means for analyzing the received test cells and delivering the result through the buses to the central means;

a transportation control cell storing means for receiving through the buses the control cells generated from the central control means and temporarily storing them, and for outputting through the buses the stored cells under the control of the cell receiving control means;

a received control cell storing means for temporarily storing the received control cells and delivering through the buses the stored cells to the central control means under the control of the cell receiving control means;

a transportation test cell storing means for temporarily storing the test cells generated from the test cells generating means;

a received test cell storing means for temporarily storing the received test cells through the internal testing routes and delivering the results to the test cell analyzing means;

a transporting means for receiving in parallel the control and test cells from the transportation control cell storing means and transportation test cell storing means, converting them into series data, and outputting the converted series data to the cell multiplexing/demultiplexing means;

a received data selecting means for selecting series data output from the transporting means in loopback testing mode, and selecting data incoming from the cell multiplexing/demultiplexing means; and a receiving means for converting the control or test cells received from the received data selecting means into corresponding parallel data and outputting them to one of the transportation test cell storing means and the received control cell storing means.

* * * * *